No. 882,405. PATENTED MAR. 17, 1908.
C. G. MOBERG.
DIVIDERS.
APPLICATION FILED APR. 23, 1907.

WITNESSES
Louis C. Starker
[signature]

INVENTOR
Charles G. Moberg
BY Munn & Co
ATTORNEYS

UNITED STATES PATENT OFFICE.

CHARLES G. MOBERG, OF KEELERVILLE, SASKATCHEWAN, CANADA, ASSIGNOR OF ONE-HALF TO WILLIAM H. GIBSON, OF ORILLIA, CANADA.

DIVIDERS.

No. 882,405.   Specification of Letters Patent.   Patented March 17, 1908.

Application filed April 23, 1907. Serial No. 369,735.

*To all whom it may concern:*

Be it known that I, CHARLES G. MOBERG, a citizen of the United States of America, and a resident of Keelerville, Saskatchewan, North-West Territories, Dominion of Canada, have invented new and useful Improvements in Dividers, of which the following is a full, clear, and exact description.

This invention has reference to improvements in dividers, and has for an object, among others, to provide a tool of this character capable of accurately and automatically bisecting or otherwise dividing the distance between two points, thus making the tool of particular value for machinists, draftsmen, architects, etc.

The tool embodies in its construction a plurality of legs, preferably three in number, consisting of two outside and an intermediate leg. These legs are connected together by novel means which automatically operates to maintain the extremities of the legs in alinement, with the central leg dividing the distance between the two other legs.

Reference is to be had to the accompanying drawings forming a part of this specification, in which similar characters of reference indicate corresponding parts in all the figures.

Figure 1:
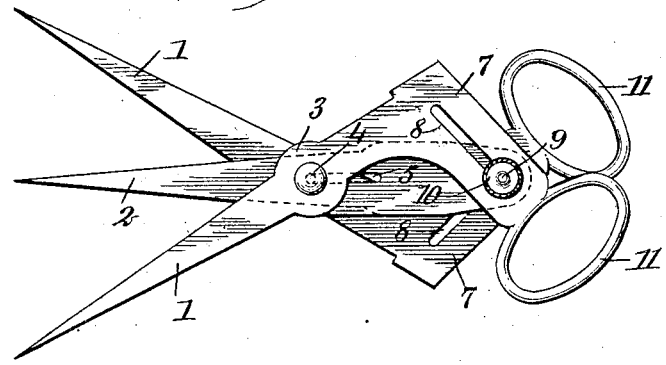
Figure 2:
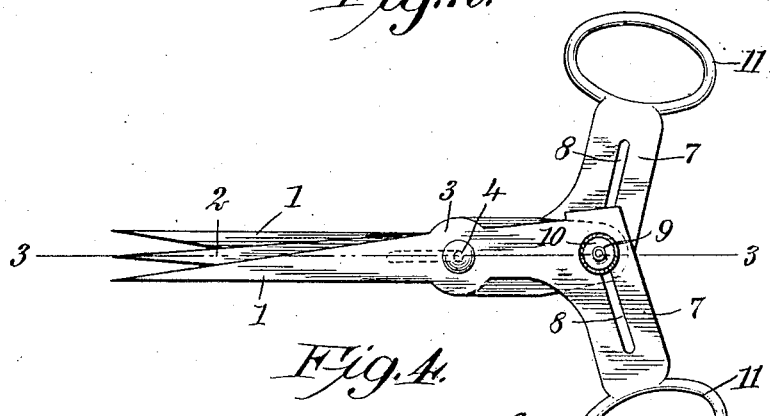
Figure 4:
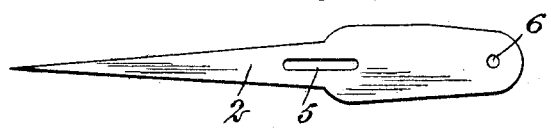
Figure 3:

Figure 1 is a side view of one form of my invention showing the legs thereof in separated position; Fig. 2 is a view corresponding to Fig. 1, with the legs of the dividers closed; Fig. 3 is a central, longitudinal section on the line 3—3 of Fig. 2, and Fig. 4 is a face view of the third or central leg.

The dividers as preferably constructed comprise two pointed limbs or legs 1, 1 and a pointed central or intermediate leg 2. The legs 1 are constructed with circular enlargements 3 intermediate their length, and are pivotally connected together concentric thereto, by a pin or rivet 4, said pin or rivet being of such length as to slidably receive the central leg 2 between the legs 1, a slot 5 being formed longitudinally in the leg 2 for this purpose.

As shown, the leg 2 is extended beyond the slot 5 where it is expanded in width and provided with an aperture 6 near its outer end. The legs 1 are also extended beyond their pivotal connection, where they are formed with angularly projecting arms 7 passing to the opposite sides of the tool. These arms are provided with slots 8 through which, and the aperture 6 of the leg 2, a screw 9 passes, the latter being provided with a thumb-nut 10 for locking the legs in adjusted position. The slots 8 of the arms 7 are arranged at such an angle as to automatically slide the leg 2 and the screw 9 fixed thereto, inwardly as the legs 1, 1 are separated, the leg 2 being correspondingly projected as the legs 1 are brought together. The amount of the inclination of said slots is such as to always maintain the points or extremities of all the legs in accurate alinement. Formed at the ends of the arms 7 are finger-loops 11 by which the dividers may be operated in the same manner as an ordinary pair of shears.

As herein shown, the point of the central leg 2 and the slot 5 and aperture 6 therein are arranged in alinement, which construction operates as said leg is guided on the pivot 4 to automatically bisect the distance between the points of the legs 1. It is, however, obvious that the leg 2 might be disposed to divide the distance between the legs 1 in other proportions, or the central leg 2 be multiplied; also various other immaterial changes might be made in the construction from that shown and described without departing from my invention as defined in the annexed claims.

Having thus described my invention I claim as new and desire to secure by Letters Patent:

1. A tool of the character described, comprising three or more legs, and means directly connecting said legs together automatically operating to maintain the extremities thereof in alinement when said legs are separated.

2. A tool of the character described, comprising two legs, a pivot directly connecting said legs together, a third leg having a sliding connection with said pivot, and means fixed to said third leg having a sliding connection with the other two legs and coacting with the pivot to automatically retain the extremities of the legs in alinement when the legs are separated.

3. A tool of the character described, comprising two legs, a pivot connecting said legs together, a third leg having a sliding connection with said pivot, and means for clamping said legs in adjusted position, carried by said third leg, and having a sliding connection with said two other legs.

4. A tool of the character described, comprising two legs, a pivot connecting said legs together, finger loops for operating said legs, a third leg having a sliding connection with said pivot, and means connecting all of said legs together automatically operating in conjunction with the pivot to maintain the extremities thereof in alinement.

5. A tool of the character described, comprising two legs having slotted arms, a pivot connecting said legs together, a third leg having a sliding connection with said pivot, and means for clamping said legs in adjusted position, carried by said third leg and passing through the slots of said arms.

6. A tool of the character described, comprising two legs having slotted arms with finger loops attached thereto, a pivot connecting said arms together, a third leg slidably connected with said pivot, a screw carried by said third leg passing through the slots of said arms, and a thumb-nut threaded on said screw 7. A device of the character described, comprising two legs, a pivot directly connecting said legs together, a third leg having a sliding engagement with said pivot, and means directly connecting all of said legs together automatically operating in conjunction with the pivot to maintain the third leg in a bisecting position.

In testimony whereof I have signed my name to this specification in the presence of two subscribing witnesses.

CHARLES G. MOBERG.

Witnesses:
    WILLIAM T. FOWLE,
    WILLIAM KATEN.